United States Patent [19]
Huspen

[11] 3,750,379
[45] Aug. 7, 1973

[54] COLLAPSIBLE RAKE
[76] Inventor: Fred J. Huspen, 750 Lincoln St., Glenview, Ill. 60025
[22] Filed: June 19, 1972
[21] Appl. No.: 263,848

[52] U.S. Cl. .......................................... 56/400.18
[51] Int. Cl. ............................................ A01d 7/00
[58] Field of Search .................. 56/400.18, 400.19, 56/400.2, 400.17; 294/53.5

[56] References Cited
UNITED STATES PATENTS

| | | | |
|---|---|---|---|
| 2,149,429 | 3/1939 | Finkes | 56/400.18 |
| 2,821,834 | 2/1958 | Walker | 56/400.19 |
| 2,904,951 | 9/1959 | Glorer | 56/400.18 |
| 3,258,903 | 7/1966 | Rienacker et al. | 56/400.18 |
| 3,394,536 | 7/1968 | Henne | 56/400.18 |
| 3,401,971 | 9/1968 | Cronquist | 294/53.5 |

FOREIGN PATENTS OR APPLICATIONS
512,282  11/1930  Germany .......................... 56/400.19

Primary Examiner—Russell R. Kinsey
Attorney—Axel A. Hofgren et al.

[57] ABSTRACT

An adjustable rake including an elongated handle having a transverse prong guide secured thereto at one end thereof. Mounted on the handle for slidable movement is a prong carrier and it in turn pivotally mounts respective ends of a plurality of prongs which extend therefrom through the prong guide. By changing the position of the carrier on the handle, the width of swath of the rake can be regulated. Means are provided for securing the prong carrier to the handle at any of several desired positions of adjustment.

5 Claims, 6 Drawing Figures

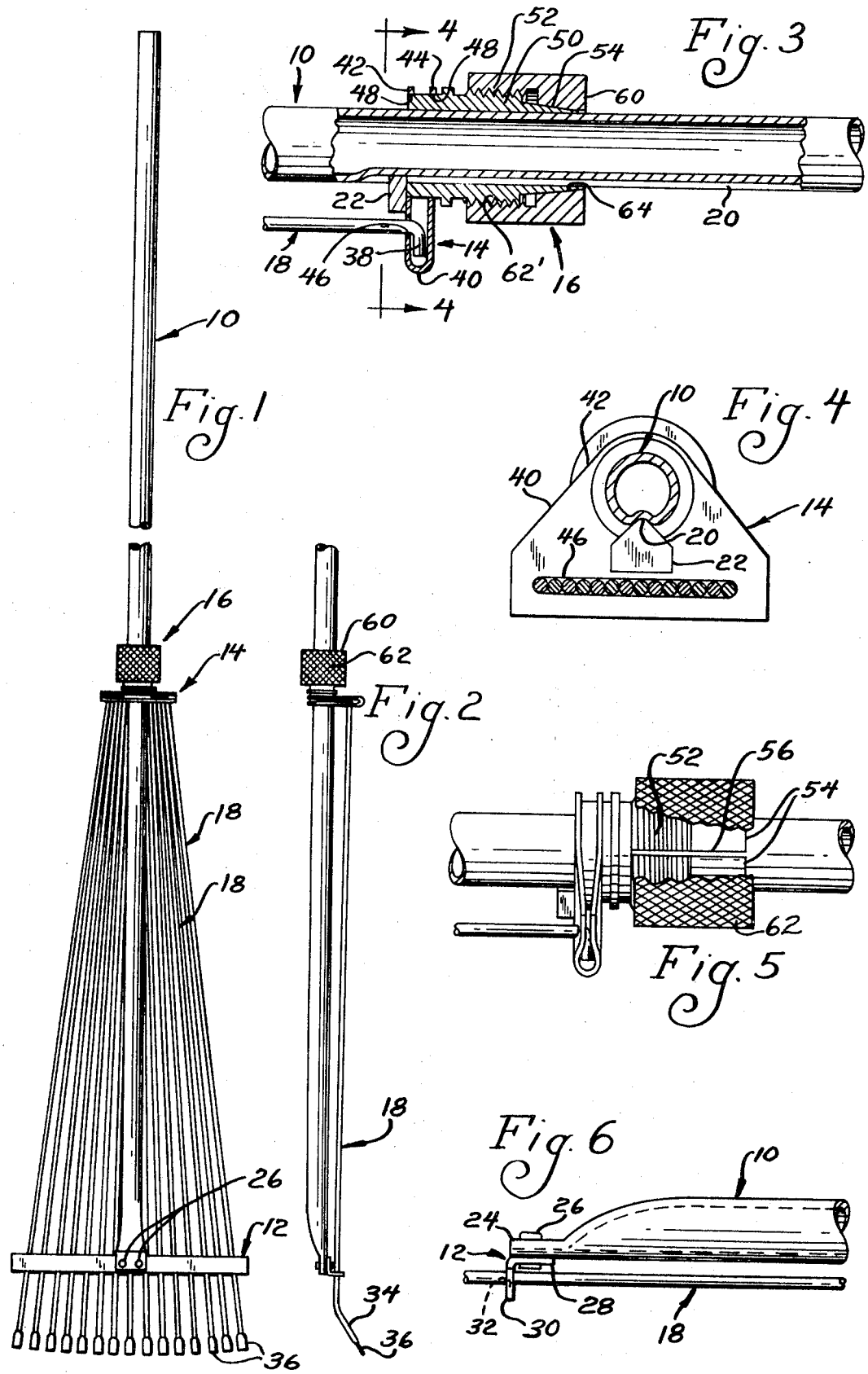

COLLAPSIBLE RAKE

BACKGROUND OF THE INVENTION

This invention relates to adjustable rakes.

In Rienacker et al. U.S. Pat. No. 3,258,903 and Henne U.S. Pat. No. 3,394,536 there are disclosed adjustable rake constructions which may be used for hand cultivating purposes or for other purposes as, for example, raising the pile on a shag rug. Such rakes are adjustable in that each includes an elongated prong guide at one end of the handle as well as a prong carrier mounted for slidable movement on the handle in such a way that prongs extending between the prong carrier and the prong guide are moved outwardly as the prong carrier moves toward the prong guide. By selectively securing the prong carrier to the handle at a given location, a desired overall rake width may be selected and the distance between the work performing ends of the prongs may be selectively regulated for any of a variety of purposes.

SUMMARY OF THE INVENTION

It is the principal object of the invention to provide a new and improved adjustable rake construction.

More specifically, it is an object of the invention to provide an easily formed prong carrier as well as a new and improved means for selectively securing the prong carrier to the handle at any desired position of adjustment.

The exemplary embodiment of the invention achieves the foregoing objects in a rake construction including a handle with an elongated prong guide extending transverse thereto and secured thereto at one end thereof. The prong guide slidably receives a plurality of elongated prongs which are pivotally secured to a prong carrier slidably mounted on the handle. In addition, means are provided for selectively securing the carrier to the handle at any desired position within its range of movement thereon.

According to the preferred embodiment, the prong carrier comprises a U-shaped element formed of sheet metal or the like extending about the handle. The legs of the U-shaped member are spaced apart a distance on the order of the thickness of the prongs and the leg thereof closest to the prong guide includes an elongated slot extending generally transversely to the length of the leg for receiving the prongs. The prongs have downturned ends extending generally transversely to their main body portions and pass through the slot to have the downturned ends received between the two legs of the U-shaped element to securely hold the same therein while allowing a substantial degree of pivotal movement.

The invention also contemplates, as noted earlier, an improved means for securing the pong carrier to the handle at a desired position of adjustment and specifically provided in the exemplary embodiment is a tubular member having a threaded portion with a tapered surface extending away therefrom. Slots transverse to the length of the tubular member are provided therein and the tube is formed of a resilient material. A nut-like structure is threadedly received on the threads on the tube and includes an interior tapered surface conforming approximately to the tapered surface on the tubular member. By advancing the nut on the threads, those portions of the tubular member having the tapered surface are cammed inwardly into tight frictional engagement with the handle to secure the prong carrier at a desired location on the handle. By turning the nut on the threads in the opposite direction, pressure is relieved on the tapered surfaces of the tubular member and by reason of the resiliency of the same, the same move out of frictional engagement with the handle to permit the prong carrier to be selectively moved on the handle.

Other objects and advantages will become apparent from the following specification taken in conjunction with the accompanying drawings.

DESCRIPTION OF THE DRAWINGS

FIG. 1 is a side elevation of a rake made according to the invention;

FIG. 2 is a fragmentary side elevation of the rake and viewed from a direction approximately 90° to the direction from which FIG. 1 was taken;

FIG. 3 is an enlarged fragmentary view of a prong carrier and securing means with parts shown in section;

FIG. 4 is a vertical section taken approximately along the line 4—4 of FIG. 3;

FIG. 5 is a fragmentary view of the prong carrier and securing means with a part of the latter broken away for clarity; and FIG. 6 is a fragmentary, enlarged view of the handle and prong guide.

DESCRIPTION OF THE PREFERRED EMBODIMENT

An exemplary embodiment of an adjustable rake made according to the invention is illustrated in the drawings and with specific reference to FIG. 1 is seen to include an elongated handle, generally designated 10; an elongated prong guide, generally designated 12, mounted on one end of the handle 10 and extending transversely thereto; a prong carrier, generally designated 14, slidably mounted on the handle 10; a securing means, generally designated 16, for securing the prong carrier 14 at a desired position of adjustment on the handle 10; and a plurality of elongated prongs, each generally designated 18, pivotally secured to the prong carrier 14 and slidably received by the prong guide 12.

As can be best seen in FIGS. 3 and 4, the handle 10 is tubular in nature and, more specifically, in the form of a cylindrical tube. A portion of the same includes an elongated recess or groove 20 formed therein in which is received a tooth 22 secured to the prong carrier 14 to preclude the same from twisting about the axis of the handle 10 when the prong carrier 14 is moved on the handle 10.

With reference to FIG. 6, one end of the handle 10 is flattened as at 24 for receipt of a pair of rivets 26 for securing the prong guide 12 thereto.

FIG. 6 also illustrates the prong guide 12 as being formed of an angle iron or the like having one leg 28 for receiving the rivets 26 and a leg 30 at approximately 90° thereto having a plurality of apertures 32 therein for slidably receiving the prongs 18. In a typical construction, the apertures 32 will be spaced along the length of the prong guide 12 on approximately ½ inch centers and it will also be observed from FIG. 1 that the total length of the prong guide 12 is substantially greater than that of the prong carrier 14 so that as the latter is moved towards the former, the prongs 18 will spread.

As illustrated in FIG. 2, the prongs 18 have working ends 34 each terminating in flattened teeth 36. As seen in FIG. 3, the opposite ends of the prongs 18 have turned down transverse ends 38 pivotally received in the prong carrier 14.

With reference specifically to FIGS. 3 and 4, the prong carrier 14 is seen to include a U-shaped member 40 having legs 42 and 44. The leg 42 is located nearer to the prong guide 12 than the leg 44 while the legs 42 and 44 are spaced from each other a distance just slightly greater than the thickness of the prongs 18 and, more specifically, the thickness of the transverse ends 38 thereof.

The leg 42 includes an elongated slot 46 which extends generally transversely to the length of the leg 42, has a width approximately equal to the thickness of the prongs 18 and a length just slightly greater than some multiple of the thickness of the prongs 18 corresponding to the number of prongs 18 corresponding to the number of prongs 18 provided in the rake. In addition, the slot 46 is located above the base of the U-shaped member 40 a distance at least slightly greater than the length of the transverse ends 38 of the prongs 18.

The prongs 18 are assembled with the prong carrier 14 by passing the working ends 34 from right to left through the slot 46 while the leg 44 is at least 90° from the position shown in FIG. 3. The leg 44 is then moved to the position shown in FIG. 3 with the result that the ends 38 of the prongs 18 are securely but pivotally received and mounted in the prong carrier 14.

Each of the legs 42 and 44 includes an opening 48 therein so that the same may be disposed upon a tubular element 50 defining a portion of the securing means 16. The legs 42 and 44 may be secured thereon by any suitable means, as, for example, by welding. The tubular member 50 is formed of a resilient material and includes, intermediate its ends, external threads 52. A tapered, generally frusto-conical surface 54 extends from the threaded portion to one end of the member 50. As best seen in FIG. 5, a pair of opposed slots 56 (only one of which is shown) extend transversely to the length of the tubular member 50 through that portion of the same including at least the tapered surface 54 and possibly a portion or all of the threaded portion 52 as well. While in the exemplary embodiment only two such slots 56 are employed so as to define a pair of opposed members, additional, oppositely located slots 56 could be employed if desired.

The securing means 16 is completed by a nut 60 having an outer knurled surface 62 for ease of gripping by the user of the rake. Internally, the nut 60 includes a threaded surface 62' mating with the threaded portion 52 on the tubular member 50 and a tapered surface 64 which is adapted to matingly engage the surface 54 on the tubular member. The tapered surface 54 is a pressure receiving surface, while the tapered surface 64 is a pressure applying surface and it will be appreciated that as the nut 60 is advanced from right to left as viewed in FIG. 3 on the tubular member, the opposed members of the tubular member defined by the slots 56 will be forced inwardly into tight frictional engagement with the handle 10. When the nut 60 is rotated in the opposite direction, pressure is relieved and the inherent resiliency of the tubular member allows the opposed member to move radially outwardly to thereby move out of tight frictional engagement with the handle 10 to allow the prong carrier 14 to be slidably moved along that portion of the handle 10 over which such movement is permitted in accordance with the length of the prong 18.

From the foregoing, it will be appreciated that the invention provides a new and improved prong carrier which is easily fabricated in one stamping operation and, for ease of assembly, requires but a single simple bending operation. Moreover, it will be appreciated that the invention provides a new and improved securing means in that the unique construction thereof provides tight frictional engagement about virtually the entire periphery of that portion of the handle 10 with which it is engaged and in contrast to prior art constructions where virtually only point contact is established. It will also be appreciated that the securing means is easily used and manipulated by the user of the rake.

I claim:

1. In an adjustable rake having an elongated handle, a transverse prong guide secured to the handle, a prong carrier slidably received on the handle, and a plurality of elongated prongs pivotally secured to the prong carrier and slidably received in said prong guide, an improved means for selectively securing the prong carrier to the handle at any of a plurality of selected positions along the length thereof including opposed resilient means on said carrier and substantially surrounding said handle, the resiliency of each of said opposed means tending to move each away from said handle, each of said opposed means including a cam-like pressure receiving surface, and means for selectively and simultaneously applying pressure to said surfaces to force said opposed means into tight frictional engagement with said handle to secure said prong carrier thereto in a desired position thereon.

2. An adjustable rake according to claim 1 wherein said opposed means are defined by a tube-like member surrounding said handle and including at least two slots therein, said cam-like pressure receiving surfaces including tapered formations on the exterior of said member, and said pressure applying means comprises threaded means on said member and a nut-like structure threadedly received on said threaded means and including a pressure applying surface engageable with said tapered formations.

3. An adjustable rake according to claim 1 wherein each of said prongs includes a transversely directed end pivotally secured to said prong carrier and said prong carrier comprises a U-shaped element slidably received on said handle and extending generally transversely thereof, said U-shaped member including an elongated slot in one of the legs thereof and extending generally transversely to the length of said legs, said prongs extending through said slot with said transverse end thereof being received and confined between the legs of said U-shaped element.

4. An adjustable rake comprising an elongated handle, a transverse prong guide secured to the handle, a prong carrier secured to the handle, a prong carrier slidably received on the handle, a plurality of elongated prongs having generally transversely extending ends pivotally secured to said prong carrier and slidably received in said prong guide, and means for selectively securing said prong carrier to said handle at any of a plurality of selected positions along the length thereof, said prong carrier comprising a U-shaped member extending generally transversely of said handle, the legs of said U-shaped member being spaced apart a distance on the order of the thickness of said prongs, the leg of said U-shaped element nearest said prong guide including an elongated slot extending generally transversely to the length of said leg and having a width on the order of the thickness of said prongs, said transverse ends being received between the legs and said U-shaped member with said prongs extending therefrom through said slot to said prong guide.

5. An adjustable rake according to claim 4 wherein said selective securing means comprises a tubular element surrounding said handle and being secured to said prong carrier, said tubular element being provided with external threads and a tapered surface extending from said threads to an end of said element, at least two slots tranverse to the length of the tubular member in said tapered surface, and a nut having interior threads received on the threads of said tubular member and an internal surface complementary to the tapered surface on said tubular member in engagement with the tapered surface of said tubular member whereby by advancing said nut on said threads, said end of said tubular member may be cammed inwardly into tight frictional engagement with said handle to selectively lock said prong carrier at a desired position along the length of said handle.

* * * * *

Notice of Adverse Decision in Interference

In Interference No. 98,784, involving Patent No. 3,750,379, F. J. Huspen, COLLAPSIBLE RAKE, final judgment adverse to the patentee was rendered Apr. 4, 1975, as to claim 1.

[*Official Gazette August 5, 1975.*]